United States Patent Office 3,397,236
Patented Aug. 13, 1968

3,397,236
N - 2,3 - BUTADIENYL - N - METHYLBENZYL-
AMINE OR THE 2 - CHLORO - DERIVATIVE
THEREOF
Edward John Watson, Jr., Norwich, N.Y., assignor to The
Norwich Pharmacal Company, a corporation of New
York
No Drawing. Filed Dec. 29, 1965, Ser. No. 517,426
3 Claims. (Cl. 260—570.9)

ABSTRACT OF THE DISCLOSURE

Monoamine oxidase enzyme inhibiting chemical compounds of the formula:

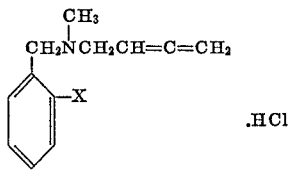

.HCl wherein X is hydrogen or chloro.

---

This invention relates to new chemical compounds of the formula:

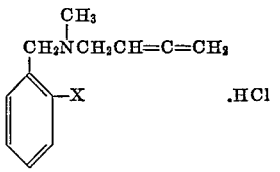

.HCl wherein X is hydrogen or chloro.

These compounds are potent inhibitors of the enzyme monoamine oxidase, a property associated with antidepressant compounds. Thus when administered perorally to rats in very low doses of the order of from 0.13–0.50 mg./kg. inhibition of the enzymatic activity of monoamine oxidase is achieved. These compounds also present an antihypertensive effect believed to be due to their monoamine oxidase inhibiting capacity.

The compounds of this invention may be readily prepared in accordance with this reaction scheme:

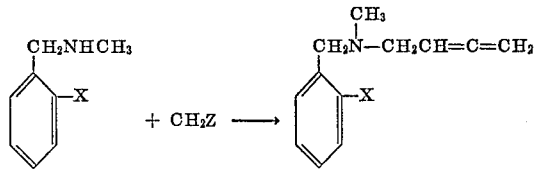

wherein Z is =C=CHCH$_2$Cl or =CH—C≡CH.

In carrying out the reaction using the alkyl chloride it is preferred to commingle the reactants in the presence of a solvent inert thereto such as water, allow the mixture to stand until reaction is deemed complete followed by basification and extraction of the organic material with a suitable solvent such as ether, removal of solvent and distillation of the residue which is readily converted to its hydrochloride salt.

In carrying out the reaction using the acetylenic reactant it is preferred to commingle the reactants in the presence of suitable solvents such as water, dimethylformamide, xylene and the like in an apparatus adapted to withstand pressure, supply pressure and heat, if desired, to the mixture until the reaction is considered complete, following which the apparatus is vented, the contents extracted with a suitable solvent such as ether, the extractant removed and the residue distilled to secure the product which is readily converted to its hydrochloride salt.

The compounds of this invention are readily admixed with solid or liquid carriers to provide conveniently dispensable pharmaceutical forms. Suitable solid carriers include lactose, magnesium stearate, sucrose, talc, stearic acid, gelatin agar, pectin, acacia and the like. Suitable liquid carriers include peanut oil, olive oil, sesame oil, water, alcohol and the like.

In order that this invention may be readily available to and understood by those skilled in the art the following examples are appended.

Example I.—N-2,3-butadienyl-N-methylbenzylamine
hydrochloride

In a bomb (capacity about 854 ml.) was placed a mixture of 121 g. (1.0 mole) of benzylmethylamine, 130 ml. of water and 170 ml. of dimethylformamide. This homogeneous mixture was cooled by placing the bomb in Dry Ice/acetone while nitrogen was bubbled through the mixture. The mixture became rather viscous.

A tank of vinylacetylene (50% xylene solution) was placed in a pan of hot water and connected with a T tube to the nitrogen stream. Vinylacetylene, 52 g. (1 mole), was condensed into the bomb. The bomb was closed, pressurized to 150 p.s.i. with nitrogen and heated to 70–98° with shaking for 20 hours.

After the bomb had been allowed to cool for one day, it was vented and twice purged with nitrogen. The contents of the bomb were removed and immediately steam distilled.

The steam distillate was transferred to a separatory funnel and extracted with two 1-liter portions of ether. The ether extracts were dried over anhydrous Na$_2$SO$_4$ and then dropped into a heated flask to remove the ether (steam bath). The residual material was distilled using a vacuum pump. About 60 g. (50%) of benzylmethylamine was collected from 50°/5.8 mm. to 67°/2.0 mm. After 1–2 g. of an intermediate fraction, N-2,3-butadienyl-N-methylbenzylamine was collected at 85–94°/2.0 mm., yield 21 g. (12% yield).

Twenty grams of the distilled liquid was placed in 200 ml. of isopropanol. Concentrated HCl (11 ml.) was added followed by 800 ml. of dry ether. After standing for two hours in the refrigerator, a crystalline precipitate formed. This was filtered off and washed with ether yielding 14 g., M.P. 121–123° of title product.

The filtrate was concentrated to about 10–20 ml. and about 500 ml. of dry ether was added. An oil separated. Trituration several times with dry ether gave a mushy solid. This was recrystallized from ethyl acetate to give 6 g., M.P. 118–120°.

The two fractions were combined to yield 20 g., M.P. 118–120°.

*Analysis.*—Calc. for C$_{12}$H$_{15}$N.HCl: C, 68.72; H, 7.69; N, 6.68. Found: C, 68.70; H, 7.54; N, 6.11.

Example II.—N-2,3-butadienyl-N-methyl-O-chlorobenzyl-
amine hydrochloride o-Chloro-N-methylbenzylamine (122 g., 0.8 mole), 5 ml. of water and 4-chloro-1,2-butadiene (75 g., 0.85 mole) was allowed to stand for 5 days at room temperature. 200 ml. of a saturated solution of Na$_2$CO$_3$ was added to the mixture with shaking. The organic layer was extracted with two 150 ml. portions of ether. The ethereal extracts were dried over Na$_2$SO$_4$ and then concentrated under vacuum. The residue was distilled. B.P. (1st fraction) 45–78° C./1.0 mm.; (2nd fraction) 79–105° C./1.0 mm. There were about 80 g. in the 2nd fraction, which was redistilled. The material which boiled at 81–91° C./ 0.2 mm. was collected (yield: 45 g. (27%)), and dissolved in dry ether, then treated with an ethereal solution of HCl. An oil was deposited which crystallized. The material was recrystallized from benzene (hot), M.P. 121–122° C.

Analysis.—$C_{12}H_{14}ClN \cdot HCl$: C, 59.03; H, 6.19; N, 5.74. Found: C, 58.78; H, 6.19; N, 5.68.

What is claimed is:
1. A compound of the formula:

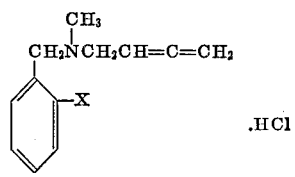

wherein X is selected from the group consisting of hydrogen and chlorine.

2. The compound according to claim 1 wherein X is hydrogen.

3. The compound according to claim 1 wherein X is chlorine.

References Cited

UNITED STATES PATENTS

| | | | |
|---|---|---|---|
| 2,073,363 | 3/1937 | Carothers et al. | 260—583 XR |
| 2,136,177 | 11/1938 | Carothers et al. | 260—583 |
| 2,647,147 | 7/1953 | Engelhardt | 260—583 |

OTHER REFERENCES

Vartanyan et al., "Chemical Abstracts," vol. 59, p. 3755 (1963).

CHARLES B. PARKER, *Primary Examiner.*

ROBERT V. HINES, *Assistant Examiner.*